(12) United States Patent
Zheng et al.

(10) Patent No.: US 9,356,674 B2
(45) Date of Patent: May 31, 2016

(54) METHOD AND SYSTEM FOR USING NON-UNIFORM CHANNEL QUANTIZATION FOR A FEEDBACK-BASED COMMUNICATION SYSTEM

(75) Inventors: Jun Zheng, San Deigo, CA (US); Mark Kent, Vista, CA (US); Vinko Erceg, Cardiff, CA (US)

(73) Assignee: BROADCOM CORPORATION, Irvine, CA (US)

( * ) Notice: Subject to any disclaimer, the term of this patent is extended or adjusted under 35 U.S.C. 154(b) by 1223 days.

(21) Appl. No.: 12/652,150

(22) Filed: Jan. 5, 2010

(65) Prior Publication Data

US 2011/0165846 A1 Jul. 7, 2011

(51) Int. Cl.
| | |
|---|---|
| *H04B 17/00* | (2015.01) |
| *H04B 7/06* | (2006.01) |
| *H04B 7/04* | (2006.01) |
| *H04L 1/00* | (2006.01) |
| *H04L 25/02* | (2006.01) |

(52) U.S. Cl.
CPC ............ *H04B 7/0626* (2013.01); *H04B 7/0417* (2013.01); *H04L 1/003* (2013.01); *H04L 1/0026* (2013.01); *H04L 25/0202* (2013.01)

(58) Field of Classification Search
USPC .................. 455/67.7, 67.13, 67.11, 515, 509; 375/240.03, 240.05, 240.22, 252, 267, 375/220, 221; 370/329, 252
See application file for complete search history.

(56) References Cited

U.S. PATENT DOCUMENTS

| | | | | |
|---|---|---|---|---|
| 6,690,652 | B1 * | 2/2004 | Sadri .............................. | 370/252 |
| 8,068,554 | B2 * | 11/2011 | Lin et al. ....................... | 375/267 |
| 2005/0090205 | A1 * | 4/2005 | Catreux-Erceg ....... | H04B 7/061 455/78 |
| 2005/0129137 | A1 * | 6/2005 | Yamada ............... | H04B 7/0417 375/267 |
| 2006/0009189 | A1 * | 1/2006 | Kim ...................... | H04B 7/0626 455/403 |
| 2007/0042717 | A1 * | 2/2007 | Alexiou ............... | H04B 7/0647 455/69 |
| 2007/0195974 | A1 * | 8/2007 | Li et al. ......................... | 381/94.3 |
| 2007/0298822 | A1 * | 12/2007 | Wan et al. ...................... | 455/509 |
| 2008/0165875 | A1 * | 7/2008 | Mundarath et al. ........... | 375/262 |
| 2008/0227495 | A1 * | 9/2008 | Kotecha et al. ............ | 455/562.1 |
| 2009/0097551 | A1 * | 4/2009 | Zhang et al. ............. | 375/240.03 |
| 2011/0019631 | A1 * | 1/2011 | Kotecha et al. ................ | 370/329 |
| 2011/0085537 | A1 * | 4/2011 | Tsai et al. ...................... | 370/342 |
| 2011/0134978 | A1 * | 6/2011 | Au-Yeung et al. ............ | 375/224 |
| 2011/0158218 | A1 * | 6/2011 | Li et al. .......................... | 370/342 |
| 2011/0159907 | A1 * | 6/2011 | Lee et al. ....................... | 455/509 |
| 2011/0223867 | A1 * | 9/2011 | Chae et al. .................... | 455/63.1 |
| 2012/0076032 | A1 * | 3/2012 | Mundarath et al. ........... | 370/252 |

\* cited by examiner

*Primary Examiner* — Nay A Maung
*Assistant Examiner* — Erica Fleming-Hall
(74) *Attorney, Agent, or Firm* — Garlick & Markison; Shayne X. Short

(57) ABSTRACT

A mobile device estimates channel state information (CSI) comprising, for example, CQI and/or SNR, for a downlink channel. The estimated CSI is non-uniformly quantized and transmitted to the base station over a finite-rate feedback channel. Different portions of the estimated CSI are quantized using different quantization step sizes, which are determined according to a performance metric function such as a channel capacity function of the estimated CSI. A quantization step size for a portion of the estimated CSI is increased if a low distribution probability is indicated by the portion of the estimated CSI. A quantization step size for a portion of the estimated CSI is decreased if a high distribution probability is indicated. The mobile device quantizes the estimated CSI using the determined quantization step sizes to transmit to the base station over the finite-rate feedback channel. Downlink data transmission is received according to the transmitted CSI.

20 Claims, 7 Drawing Sheets

METHOD AND SYSTEM FOR USING NON-UNIFORM CHANNEL QUANTIZATION FOR A FEEDBACK-BASED COMMUNICATION SYSTEM

CROSS-REFERENCE TO RELATED APPLICATIONS/INCORPORATION BY REFERENCE

This application makes reference to:
U.S. application Ser. No. 11/231,416 filed on Sep. 21, 2005;

The above stated application is hereby incorporated herein by reference in its entirety.

FIELD OF THE INVENTION

Certain embodiments of the invention relate to signal processing for communication systems. More specifically, certain embodiments of the invention relate to a method and system for using non-uniform channel quantization for a feedback-based communication system.

BACKGROUND OF THE INVENTION

Wireless communication systems are widely deployed to provide various types of communication such as voice and data for a number of associated users. These systems may be implemented based on various access techniques such as, for example, code division multiple access (CDMA), time division multiple access (TDMA), frequency division multiple access (FDMA), or some other multiple access techniques.

Multiple-input multiple-output (MIMO) communication systems have the potential to offer high spectral efficiency as well as link reliability. In a MIMO communication system, multiple transmit ($N_T$) antennas and multiple receive ($N_R$) antennas are employed for communicating multiple spatially independent data streams. In a multiuser MIMO downlink communication system, the spatial degrees of freedom offered by the utilization of multiple transmit and/or receive antennas are advantageously exploited so as to enhance the system capacity by scheduling multiple users to simultaneously share resources, i.e., the spatial channel between the transmit $N_T$ antennas and the $N_R$ receive antennas. In order to schedule resources to the different users on the downlink, a base station needs channel state information (CSI). The individual users report corresponding CSI to the base station over a feedback channel.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for using non-uniform channel quantization for a feedback-based communication system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for using non-uniform channel quantization for a feedback-based communication system. In various embodiments of the invention, a communication device such as a mobile device is operable to estimate channel state information (CSI) for a downlink channel from a base station to the mobile device. The estimated CSI may be non-uniformly quantized and transmitted to the base station over a finite-rate feedback channel. The estimated CSI may comprise channel quality information such as, for example, said estimated CSI comprise channel gain, channel quality indicator (CQI), signal-to-noise ratio (SNR), signal-to-noise-interference ratio (SNIR), channel capacity, and/or channel maximum mutual information rate associated with said channel, associated with the downlink channel. In this regard, the mobile device may be operable to quantize different portions of the estimated CSI using different quantization step sizes. The mobile device may be operable to determine the different quantization step sizes with respect to a performance metric function, for example, a channel capacity function of the estimated CSI. The mobile device may be operable to increase a quantization step size for a portion of the estimated CSI, which corresponds to a low weight of the performance metric function, namely, low channel capacity and/or low probability density function of the estimated CSI. The mobile device may be operable to decrease a quantization step size for a portion of the estimated CSI, which corresponds to a high weight of the performance metric function, namely, high channel capacity and/or high probability density function of the estimated CSI. The mobile device may be operable to quantize the different portions of the estimated CSI using the determined different quantization step sizes. The quantized CSI may be transmitted to the base station over the finite-rate feedback channel. The mobile device may be operable to receive data transmission from the base station according to the transmitted CSI.

Figure 1A:
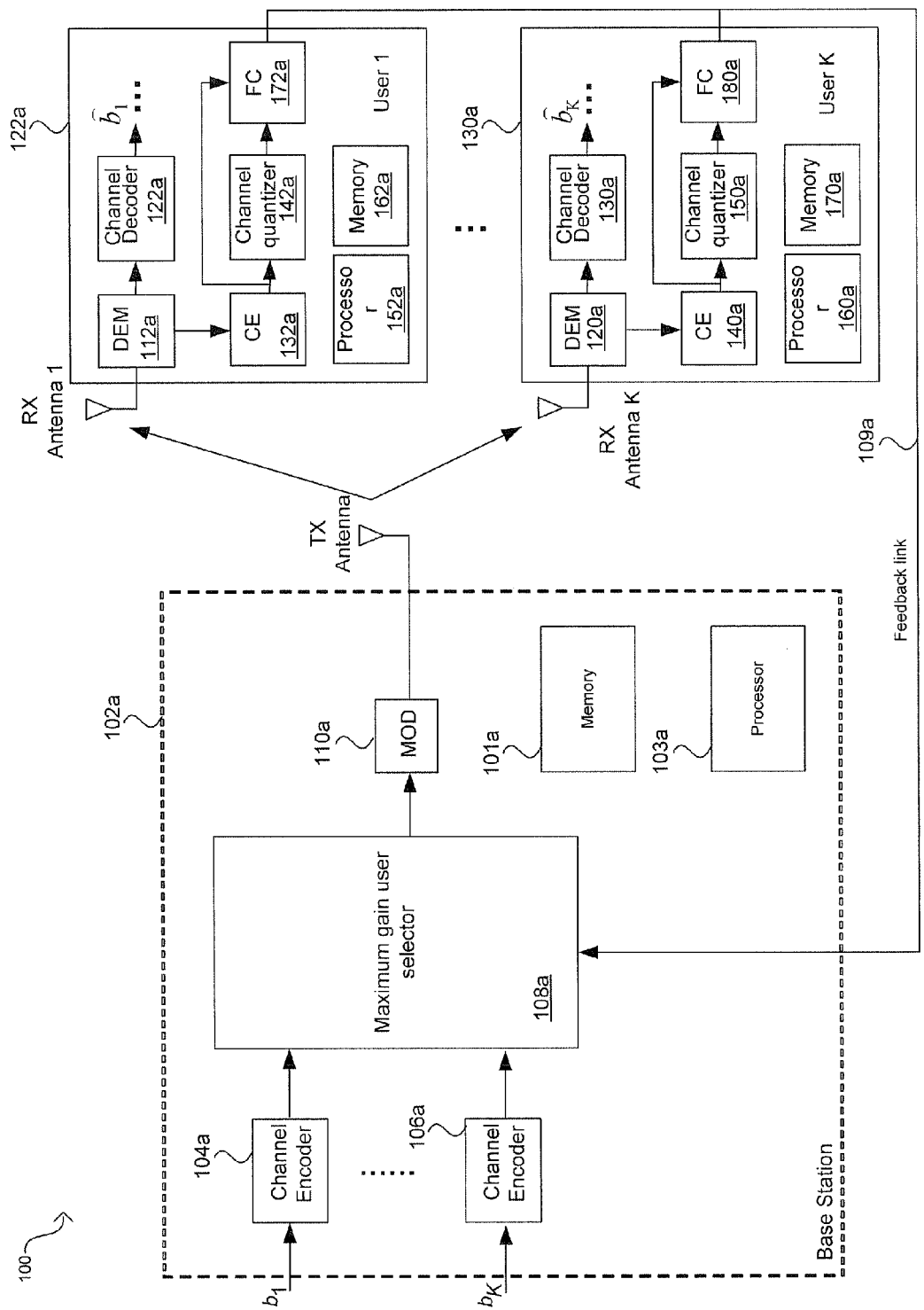
FIG. 1A is a top-level block diagram illustrating an exemplary multiuser downlink transmission system with feedback link, in accordance with an embodiment of the invention.

FIG. 1A is a top-level block diagram illustrating an exemplary multiuser downlink transmission system with feedback link, in accordance with an embodiment of the invention. Referring to FIG. 1A, there is shown a communication system 100 that may comprise a base station 102a and a plurality of users 122a, ..., 130a. The communication system 100 may correspond to a multiuser transmission system with TDMA user scheduling, for example. In the communication system 100, the base station 102a may be equipped with a single transmit antenna and K users 122a, ..., 130a may each also have a single receive antenna. In some instances, the base station 102a may be equipped with multiple transmit antennas. The base station 102a may comprise a plurality of channel encoders 104a, ..., 106a, a maximum gain user selector 108a, a modulator (MOD) 110a, a processor 101a, and a memory 103a. Each of the plurality of users 122a, ..., 130a may comprise one of a plurality of demodulators (DEM) 112a, ..., 120a, one of a plurality of channel decoders 122a, ..., 130a, one of a plurality of channel estimators (CE) 132a, ..., 140a, one of a plurality of channel quantizers 142a, ..., 150a, and one of a plurality of feedback controllers (FC) 172a, ..., 180a. Each of the plurality of users 122a, ..., 130a may also comprise one of a plurality of processors 152a, ..., 160a, and one of a plurality of memories 162a, ..., 170a.

The channel encoders 104a, ..., 106a may comprise suitable logic, circuitry, and/or code that may be adapted to encode binary data for each of the K users in the communication system 100. In this regard, the channel encoders 104a, ..., 106a may encode the binary bit streams $b_1, \ldots, b_k$, respectively. The maximum gain user selector 108a may comprise suitable logic, circuitry, and/or code that may be adapted to select the binary bit stream from the user with the strongest channel gain to transmit. In this regard, the maximum gain user selector 108a may require knowledge of the gain of the downlink channel for each of the users 122a, ..., 130a. In a frequency division duplex (FDD) system, the base station 102a may obtain the downlink channel state information (CSI) through a finite-rate feedback link 109a from the users. The channel state information received by the base station 102a may be referred to as CSI at the transmitter (CSIT). The CSIT may comprise channel quality information reported by the individual users. The reported channel quality information may comprise channel gain, channel direction, channel quality indicator (CQI), signal-to-noise ratio (SNR), signal-to-noise-interference ratio (SNIR), channel capacity, and/or channel maximum mutual information rate. The modulator 110a may comprise suitable logic, circuitry, and/or code that may be adapted to modulate the binary bit stream that corresponds to the user selected by the maximum gain user selector 108a. In this regard, the modulation operation on the binary bit stream may result in a plurality of complex symbols, for example.

The processor 103a may comprise suitable logic, circuitry, and/or code that may be adapted to process information and/or data associated with the generation of transmission signals at the base station 102a. The processor 103a may also be adapted to control at least a portion of the operations of the base station 102a such as the channel encoders 104a, ..., 106a, the maximum gain user selector 108a, the modulator 110a, and/or the memory 101a. The memory 101a may comprise suitable logic, circuitry, and/or code that may be adapted to store data and/or control information that may be utilized in the operation of at least a portion of the base station 102a.

The demodulators 112a, ..., 120a in the users 122a, ..., 130a may comprise suitable logic, circuitry, and/or code that may be adapted to demodulate the signals received from the base station 102a, for example. The channel decoders 122a, ..., 130a may comprise suitable logic, circuitry, and/or code that may be adapted to decode the demodulated signals from the demodulators 132a, ..., 140a into received binary bit streams $\hat{b}_1, \ldots, \hat{b}_k$, for example. The channel estimators 132a, ..., 140a may comprise suitable logic, circuitry, and/or code that may be adapted to estimate channel state information for one or more receive channels. The channel quantizers 142a, ..., 150a may comprise suitable logic, circuitry, and/or code that may be adapted to quantize channel state information estimated by the channel estimators 132a, ..., 140a, respectively. In this regard, the channel quantizers 142a, ..., 150a may utilize quantization levels that may be stored in the memories 162a, ..., 170a. The quantization levels may be determined based on the feedback rate constraint of the communication system 100, the number of user in the system, the channel statistical distributions, channel quality information, and/or at least one performance metric that may be optimized, for example. In this regard, the channel quantizers 142a, ..., 150a may be operable to quantize the estimated channel state information via a uniform quantization process or a non-uniform quantization process.

In a uniform quantization process, a quantization step size used may be a predetermined or dynamically determined constant value. However, in a non-uniform quantization process, the quantization step size used varies according to, for example, a performance metric function, for example, a channel capacity function of the estimated channel state information. A low resolution quantization step size may be utilized for a portion of the estimated CSI, which corresponds to a low probability of appearance, namely, low channel capacity and/or low probability density function of the estimated CSI. A high resolution quantization step size may be utilized for a portion of the estimated CSI, which corresponds to a high probability of appearance, namely, high channel capacity and/or high probability density function of the estimated CSI. The feedback controllers 172a, ..., 180a may comprise suitable logic, circuitry, and/or code that may be adapted to select at least a portion of the channel state information generated by the channel quantizers 142a, ..., 150a for transmission to the base station 102a via the feedback link 109a.

In operation, input signals $b_1, \ldots, b_k$ may be encoded by the channel encoders 104a, ..., 106a. Based on the knowledge of the downlink channel state information received from the users 122a, ..., 130a via the feedback link 109a, the maximum gain user selector 108a may select a users to transmit. The binary data of the selected user may be modulated by the modulator 110a. After the signal is transmitted from the single base station antenna and after it arrives at each of the users 122a, ..., 130a, it may be demodulated using corresponding estimated channel state information from the channel estimators 132a, ..., 140a. The resulting demodulated signals may be decoded into received binary bit streams $\hat{b}_1, \ldots, \hat{b}_k$. The estimated channel state information may be quantized by the channel quantizers 142a, ..., 150a to feedback to the base station 102a over the feedback link 109a. The channel quantizers 142a, ..., 150a may be operable to non-uniformly quantize the estimated channel state information using quantization step size that may be determined based on the corresponding estimated channel state information.

Figure 1B:
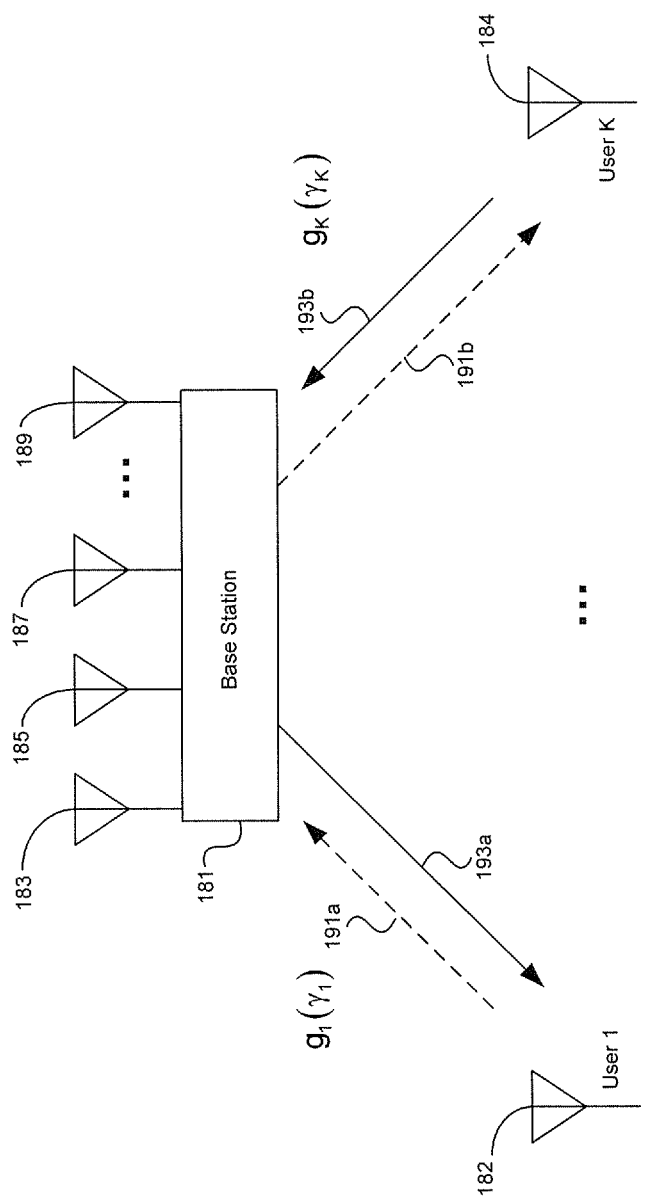
FIG. 1B is a diagram illustrating exemplary signal transmission from the base station to the receivers of FIG. 1B, in accordance with an embodiment of the invention.

FIG. 1B is a diagram illustrating exemplary signal transmission from the base station to the receivers of FIG. 1B, in accordance with an embodiment of the invention. There is shown a base station 181, a first user (user 1) 182, and a $K^{th}$ user (user K) 184, where K corresponds to the maximum number of users. In this instance, the base station 181 may comprise antennas 183, 185, 187, through 189. The base station 181 may be equipped with M(M≥1) antennas, for example. The operation of the base station 181 may be substantially similar to the operation of the base station 102a described in FIG. 1A. The operation of the first user 182 and the K$^{th}$ user 184 may be substantially similar to the operation of users 122a, ..., 130a in FIG. 1A. In this regard, the first user 182 and the K$^{th}$ user 184 may each have a single antenna.

In this instance, the base station may have a communication link 193a with the first user 182 and a communication link 191b with the K$^{th}$ user 184. The link quality $\gamma_1$ of the first user 182 may be quantized into $g_1(\gamma_1)$ and may be fed back to the base station 181 through feedback link 191a. Similarly, link quality $\gamma_K$ of the K$^{th}$ user 184 may be quantized into $g_K(\gamma_K)$ and may be fed back to the base station 181 through feedback link 193b. The user link quality such as $\gamma_1$ and $\gamma_K$ may be non-uniformly quantized using a quantization step size determined according to the corresponding user link quality such as $\gamma_1$ and $\gamma_K$. For example, in instances where the user link quality such as $\gamma_1$ may correspond to a lower CQI probability region, a low resolution quantization step size may be used to quantize the user link quality $\gamma_1$. In instances where the user link quality such as $\gamma_1$ may correspond to a higher CQI probability region, a high resolution quantization step size may be applied to quantize the user link quality $\gamma_1$.

Each of the K users in FIG. 1B may have knowledge of its own channel through accurate channel estimation, for example. In order to implement multiuser diversity at the base station 181, the channel state information (CSI) such as an effective signal-to-noise ratio (SNR). The effective signal-to-noise ratio (SNR) of each user, $\gamma_k|_{\kappa=1}^{K}$, may be conveyed back to the base station 181 through a rate-constraint feedback link, such as the feedback link 109a in FIG. 1A. Therefore, the channel state information received by the base station 181 may be a quantized version of $\gamma_\kappa$. The quantized version of the channel estate information may be represented by the expression:

$$g_k = Q(\gamma_k) \in C \square \{n_1, n_2, \ldots, n_N\}, k=1, 2, \ldots, K, \quad (1)$$

where N is the total number of quantization levels such that $N=2^B$ and B is the user's feedback rate, in bits per channel update for example. Based on the feedback information $g_k$ from the users, the base station 181 may select the strongest user to communicate or transmit based on the expression:

$$k_{sel} = \arg\max_{1 \le k \le K} g_k. \quad (2)$$

The overall performance of multiuser system with a finite-rate feedback may be given by the expression:

$$F = E_{\{\gamma_k\}_{k=1}^K}[f(\gamma_{k_{sel}})] \quad (3)$$

where $E(f(\gamma_k))$ is an expected value for $f(\gamma_k)$, k=1, ..., K and $f(\gamma_k)$ is a performance or optimization metric function that describes the link quality of the $\kappa^{th}$ user to the base station 181. For example, when system capacity is selected as the optimization objective or performance metric, then $f(\cdot)$ may be given by the expression:

$$f(\gamma) = \log_2(1 + \rho \cdot \gamma) \quad (4)$$

where $\rho$ is the average SNR.

Quantization of the channel state information may be performed by, for example, conventional scalar quantizers, with either uniform or non-uniform quantization schemes. A N-level, namely, $\log_2(N)$ bits, scalar quantizer may be fully characterized by N+1 thresholds. For example, quantization of the channel state information such as CQI may be described via N+1 CQI thresholds, $\{CQI_0, CQI_1, \ldots, CQI_{N+1}\}$, where, $CQI_0=0$, and $CQI_{N+1}=+\infty$. A quantization step may be represented by the difference between two adjacent CQI thresholds. In this regard, a quantization step in a uniform quantization has a constant size. A quantization step in a non-uniform quantization has a variable size. A denser (high resolution) quantization step size may be utilized in regions with high probability CQI appearance so as to improve CQI quantization performance. A scattered or sparse (low resolution) quantization step size may be utilized in regions with low probability CQI appearance so as to save bandwidth in CQI quantization. In other words, quantization step and/or step size may be optimized with respect to a performance metric function, for example, a channel capacity function of the estimated CSI, to optimize quantization performance.

A conventional scalar quantizer may represent a continuous value, for example, $\gamma_k$, by a quantized discrete version $\hat{\gamma}_k$, such that the representation error $\tilde{\gamma}_k = \gamma_k - \hat{\gamma}_k$, or a function of $\tilde{\gamma}_k$ such as $\tilde{\gamma}_k|_{2^r}$, for example, is minimized. Conventional scalar quantizers may be limited in their ability to separate the strongest user from others through the quantization process. As a result of the finite quantization levels or regions that may result from the finite-rate feedback, utilizing a conventional scalar quantizer may result in more than one user being quantized into the same integer $n_t \in C$ with high probability, and the transmitter may not able to select the strongest user or receiver to communicate in most situations and experience performance degradation.

Figure 2:
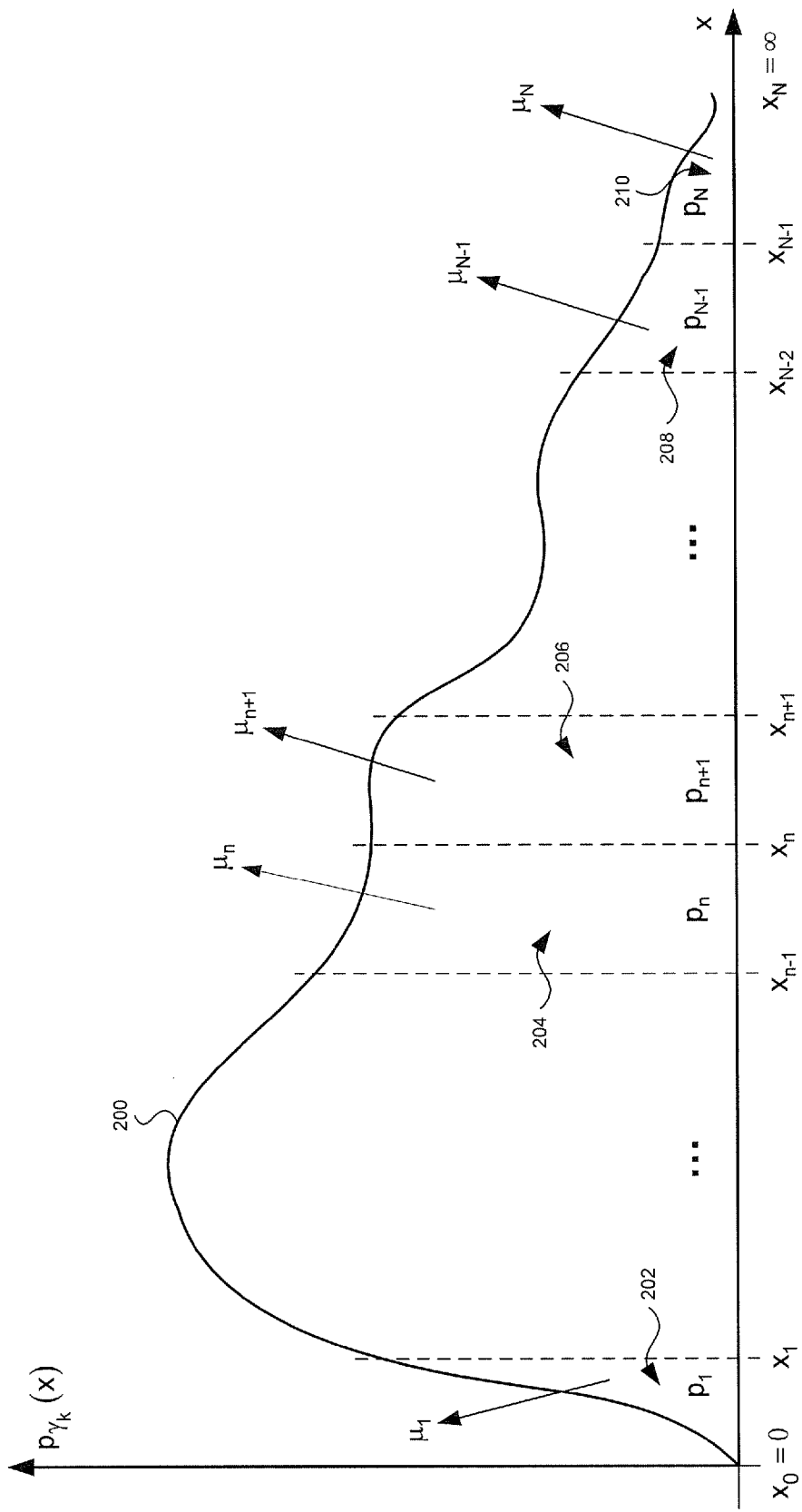
FIG. 2 is a diagram illustrating an exemplary probability density function (PDF) for performance metric $f(\gamma)$, in accordance with an embodiment of the invention.

FIG. 2 is a diagram illustrating an exemplary probability density function (PDF) for performance metric $f(\gamma)$, in accordance with an embodiment of the invention. Referring to FIG. 2, there is shown a probability density function 200 given by $p_{\gamma_k}(x)$ that corresponds to a multiuser system with finite-rate feedback where the effective SNRs $\gamma_k$ for each of the K users may be independently and identically distributed (i. i. d.). A general optimization or performance metric function, $z_k = f(\gamma_k)$, may be selected as the design objective for the multiuser system that corresponds to the probability density function 200. In this regard, the performance metric function may be a monotonically increasing or decreasing function, for example. The performance metric to be optimized may be a system SNR, a bit-error-rate (BER), or a system capacity, for example. As shown in FIG. 2, the real axis (x-axis) may be partitioned partition by N+1 thresholds into N regions or levels 202, ..., 204. 206, ..., 208, and 210, each corresponding to one of the channel state information quantization levels. The partitioning thresholds, represented by $x_0, x_1, \ldots, x_N$, may be ordered as indicated by the following expression:

$$0 = x_0 < x_1 < \ldots < x_{N-1} < x_N = \infty. \quad (5)$$

The differences between the successive channel state information quantization levels, namely, $|x_1-x_0|, |x_2-x_1|, \ldots, |x_{N-1}-x_{N-1}|$, are referred to quantization step size. In this regard, the quantization step size used to quantize the channel state information may vary (non-uniform) depending on a performance metric function such as a distribution probability function of corresponding channel state information. A low resolution (sparse) quantization step size may be utilized for a portion corresponding to a low probability of appearance. A high resolution (denser) quantization step size may be utilized for a portion corresponding to a high probability of appearance.

A conditional mean $\mu_n$ of the metric function $z_k$ in the region $\gamma_k \in [x_{n-1}, x_n]$, may be given by the expression:

$$\mu_n = \frac{\int_{x_{n-1}}^{x_n} f(x) \cdot p_{\gamma_k}(x) dx}{\int_{x_{n-1}}^{x_n} dx} = \frac{\int_{x_{n-1}}^{x_n} f(x) \cdot p_{\gamma_k}(x) dx}{F_{\gamma_k}(x_n) - F_{\gamma_k}(x_{n-1})} \quad (6)$$

where $F_{\gamma_k}(x)$ is a cumulative distribution function (CDF) of the random variable $\gamma_k$. The value of equation (6) may be determined for each of the N regions 202, ..., 204. 206, ..., 208, and 210. Based on order statistics property, the CDF of the largest $\gamma_K$ from all K users may be given by the expression:

$$F_{\gamma_{max}}(X) = F_{\gamma_k}^K(x), \gamma_{max} = \max_{1 \leq k \leq K} \gamma_k. \quad (7)$$

The probability that the strongest user falls within a region given by $\gamma_{max} \in [x_{n-1}, x_n]$ may be represented by:

$$p_n = F_{\gamma_{max}}(x_n) - F_{\gamma_{max}}(x_{n-1}) = F_{\gamma_k}^K(x_n) - F_{\gamma_k}^K(x_{n-1}). \quad (8)$$

In this regard, the value of equation (8) may be determined for each of the N regions 202, ..., 204. 206, ..., 208, and 210.

There may exist other users, in addition to the strongest one, that may fall into a quantization region $[x_{n-1}, x_n]$. As a result, the base station 181 in FIG. 1B may not able to determine the strongest user from the candidates available in the quantization region. The base station 181 may then pick one of the available users as the strongest user for the quantization region. The transmitter selection may be performed randomly, for example. In this case, the system performance may be determined by the conditional mean $\mu_n$, and overall system performance in terms of the metric $f(\gamma)$ may be given by the expression:

$$J = \sum_{n=1}^{N} p_n \cdot \mu_n = \sum_{n=1}^{N} \left( F_{\gamma_k}^K(x_n) - F_{\gamma_k}^K(x_{n-1}) \right) \cdot \mu_n, \quad (9)$$

where J is an objective function of the number of users K and the quantization thresholds $x_1, \ldots, x_{N-1}$ that correspond to the N regions or levels 202, ..., 204. 206, ..., 208, and 210 in FIG. 2. The objective function J may be represented by $J(K, x_1, \ldots, x_{N-1})$, for example.

Optimizing or maximizing the performance or objective function $J(\cdot)$ with respect to the quantization thresholds or levels $x_1, \ldots, x_{N-1}$, may require the use of optimization algorithms since $J(\cdot)$ may be a highly multivariate non-convex or non-concave function with an unlimited domain, for example. When the probability distribution $p_{\gamma_k}(x)$ and the metric function $f(\gamma)$ are sufficiently smooth functions to be continuous, which may occur in most practical cases, conditions for the maximization of function $J(\cdot)$ may be expressed by:

$$\frac{\partial J(x_1, \ldots, x_{N-1})}{\partial x_n} = 0, 1 \leq n \leq N-1. \quad (10)$$

The conditions that result from equation (10) may be simplified and may be given by the expression:

$$f(x_n) = \mu_n + \alpha_n \cdot (\mu_{n+1} - \mu_n) \quad (11)$$

where $\alpha_n$ is a real coefficient such that $0 < \alpha_n < 1$, and $\alpha_n$ may be given by the expression:

$$\alpha_n = \frac{\frac{F_{\gamma_k}^K(x_{n+1}) - F_{\gamma_k}^K(x_n)}{F_{\gamma_k}(x_{n+1}) - F_{\gamma_k}(x_n)} - K \cdot F_{\gamma_k}^{K-1}(x_n)}{\frac{F_{\gamma_k}^K(x_{n+1}) - F_{\gamma_k}^K(x_n)}{F_{\gamma_k}(x_{n+1}) - F_{\gamma_k}(x_n)} - \frac{F_{\gamma_k}^K(x_n) - F_{\gamma_k}^K(x_{n-1})}{F_{\gamma_k}(x_n) - F_{\gamma_k}(x_{n-1})}}. \quad (12)$$

Figure 3:
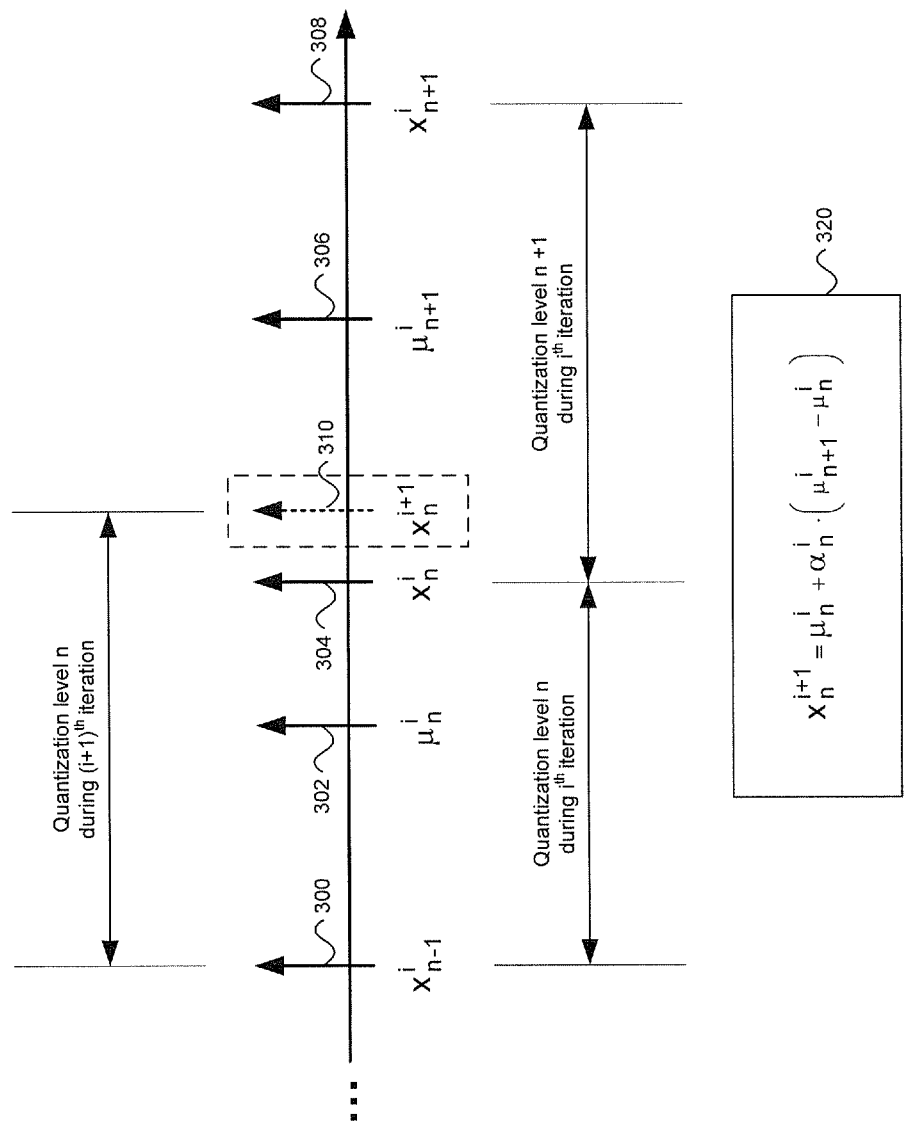
FIG. 3 is a diagram illustrating an exemplary quantization level iteration during maximization of the objective function J, in accordance with an embodiment of the invention.

FIG. 3 is a diagram illustrating an exemplary quantization level iteration during maximization of the objective function J, in accordance with an embodiment of the invention. Referring to FIG. 3, there are shown current partition thresholds 300, 304, and 308, an updated partition threshold 310, and an equation 320. Also shown are conditional means 302 and 205. In this instance, current partition thresholds 300 and 304, $x_{n-1}^i$ and $x_n^i$, may correspond to the lower and upper partition thresholds respectively for an $n^{th}$ quantization region during a current iterative step, or $i^{th}$ step, of an iterative optimization operation of the objective function J described in equation (9). The current partition thresholds 304 and 308, $x_n^i$ and $x_{n+1}^i$, may correspond to the lower and upper partition thresholds respectively for an $(n+1)^{th}$ quantization region during the $i^{th}$ step of the iterative optimization operation. The conditional means 302 and 306, $\mu_{n-1}^i$ and $\mu_{n+1}^i$, may correspond to the conditional means of the $n^{th}$ and $(n+1)^{th}$ quantization regions respectively. The updated partition threshold 310 may correspond to a value of the current partition threshold 304 during a next step, $(i+1)^{th}$, of the iterative optimization operation.

In this instance, the equation 320 shown in FIG. 3, $x_n^{i+1} = \mu_n^i + \alpha_n^i \cdot (\mu_{n+1}^i - \mu_n^i)$ may be utilized to determine the value of the updated partition threshold 310. Equation 320 may be based on the current value of the conditional means 302 and 306, and the current value of a current real coefficient $\alpha_n^i$, where $\alpha_n^i$ may be determined from the current value of the partition thresholds 300, 304, and 308 as shown in equation (9).

Figure 4:
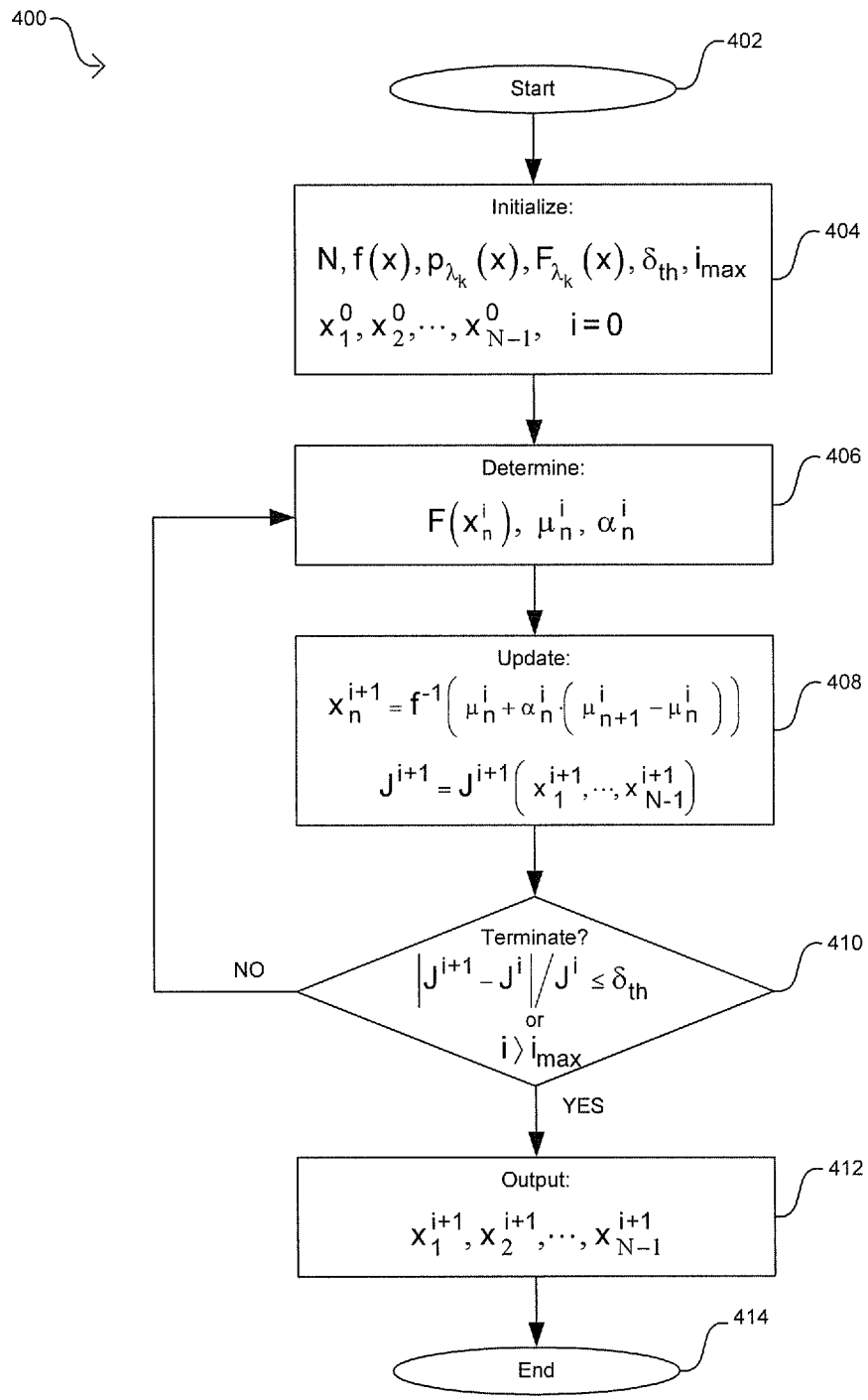
FIG. 4 is a flow diagram illustrating exemplary steps for iteratively determining quantization levels for a multiuser system with finite-rate feedback, in accordance with an embodiment of the invention.

FIG. 4 is a flow diagram illustrating exemplary steps for iteratively determining quantization levels for a multiuser system with finite-rate feedback, in accordance with an embodiment of the invention. Referring to FIG. 4, after start step 402, in step 404, an initialization operation may be performed for determining the quantization levels. In this regard, a multiuser communication system with K users may use a CSI quantizer with N quantization levels for the finite-rate feedback, where $N = 2^B$. In this regard, the N quantization levels may be non-uniformly distributed, i.e., quantization step size, namely, $|x_1 - x_0|, |x_2 - x_1|, \ldots, |x_{N-1} - x_{N-1}|$, may be determined according to corresponding channel state information such as an effective received SNR. The effective received SNR at each user may be independently and identically distributed (i. i. d.) with probability density function $p_{\gamma_k}(x)$ or cumulative distribution function $F_{\gamma_k}(x)$. The initialization operation in step 404 may comprise randomly picking N−1 real positive values and assigning them to the partition thresholds $x_1^0, \ldots, x_{N-1}^0$. The partition thresholds may be ordered such that $0 = x_0^0 < x_1^0 < \ldots < x_{N-1}^0 < x_N^0 = \infty$, for example. An objective convergence threshold, $\delta_{th}$, and a maximum iteration number, $i_{max}$, may be selected. An iteration index i may be set to 0, for example.

In step 406, the cumulative distribution function, $F_{\gamma_k}(x_n^i)$, the conditional means, $\mu_n^i$, and the real coefficient, $\alpha_n^i$ may be determined for the current iteration step, or $i^{th}$ iteration. The conditional mean and the real coefficient are functions of the current values of the partition thresholds, $x_1^i, \ldots, x_{N-1}^i$, and may be given by the following expressions:

$$\mu_n^j = \frac{\int_{x_{n-1}^j}^{x_n^j} f(x) \cdot p_{\gamma_k}(x)\, dx}{F_{\gamma_k}(x_n^j) - F_{\gamma_k}(x_{n-1}^j)}, \quad (13)$$

$$\alpha_n = \frac{\frac{F_{\gamma_k}^K(x_{n+1}^j) - F_{\gamma_k}^K(x_n^j)}{F_{\gamma_k}(x_{x+1}^j) - F_{\gamma_k}(x_n^j)} - K \cdot F_{\gamma_k}^{K-1}(x_n^j)}{\frac{F_{\gamma_k}^K(x_{n+1}^j) - F_{\gamma_k}^K(x_n^j)}{F_{\gamma_k}(x_{n+1}^j) - F_{\gamma_k}(x_n^j)} - \frac{F_{\gamma_k}^K(x_n^j) - F_{\gamma_k}^K(x_{n-1}^j)}{F_{\gamma_k}(x_n^j) - F_{\gamma_k}(x_{n-1}^j)}}. \quad (14)$$

In step 408, the values of the partition thresholds, that is, the quantization levels, may be updated based on the results from step 406. In this regard, the new partition thresholds $x_1^{i+1}, \ldots, x_{N-1}^{i+1}$ for the $(i+1)^{th}$ iteration may be updated by utilizing the following expression:

$$x_n^{i+1} = f^{-1}(\mu_n^i + \alpha_n^i \cdot (\mu_{n+1}^i - \mu_n^i)). \quad (15)$$

Correspondingly, the objective function J, as given by equation (9), may also be updated based on the results of equation (15) by the expression:

$$J^{i+1} = \sum_{n=1}^{N} \left( F_{\gamma_k}^K(x_n^{i+1}) - F_{\gamma_k}^K(x_{n-1}^{i+1}) \right) \cdot \mu_n^{i+1}. \quad (16)$$

In step 410, the iterative updating process may be terminated when the relative increment of the objective function, that is, $J^{i+1} - J^i$, compared to that of a previous iteration, may be less than the convergence threshold, as given by the following expression:

$$\frac{|J^{i+1} - J^i|}{J^i} \leq \delta_{th}, \quad (17)$$

or when the maximum number of iterations has been reached, such that:

$$i > i_{max}. \quad (18)$$

When neither the condition in equation (17) nor the condition in equation (18) is satisfied, the iterative updating process for the optimization of the objective function J may continue and the process may proceed to step 408 and the iteration number may be increased by one, that is, i=i+1. When at least one of the conditions in equations (17) and (18) is satisfied, the process may proceed to step 412.

In step 412, upon reaching convergence by satisfying at least one of the conditions in equations (17) and (18), the most recently determined quantization levels $x_1^{i+1}, \ldots, x_{N-1}^{i+1}$ from step 408 may be selected for use by a quantizer in a multiuser system with finite-rate feedback. In this regard, different sets of quantization levels may be determined for a plurality of performance metrics, such as, SNR, BER, or system capacity, for example. Each of these sets may be stored in memory in a receiver of the multiuser system, such as memories 162a, . . . , 170a in FIG. 1A. The processors 152a, . . . , 160a in the K users in the multiuser system may be utilized to select an appropriate set of quantization levels from the memories 162a, . . . , 170a and may transfer those values to the channel quantizers 142a, . . . , 150a, for example.

The approach described herein for generating a set of quantization levels in a multiuser system with finite-rate feedback based on a selected performance metric may be utilized for a communication system where the base station, such as base station 102a in FIG. 1A, may have one transmit antenna (M=1) and there may be a total of K users, such as users 122a, . . . , 130a, in the system, for example. In this regard, each user may have one receive antenna and may experience an i. i. d., zero-mean unit-variance complex Gaussian distributed fading. In this instance, the effective received SNR $\gamma_k$ for each user may have an exponential distribution with unit mean such that the PDF function may be given by the expression:

$$p_{\gamma_k}(x) = -\exp(-x). \quad (19)$$

When the effective SNR is selected as the design objective, that is, as the performance or optimization metric, the metric function $f(\cdot)$ may be given by the expression:

$$f(\gamma_k) = \rho \cdot \gamma_k, \quad (20)$$

where each user may have the same average SNR, $\rho$. From equation (20), the following expressions may be obtained:

$$F_{\gamma_k}(x) = 1 - e^{-x}, \; \mu_n = 1 + \frac{x_{n-1} \cdot e^{-x_{n-1}} - x_n \cdot e^{-x_n}}{e^{-x_{n-1}} - e^{ex_n}}. \quad (21)$$

Substitution equation (21) into equation (15) may provide an iterative design algorithm to generate the quantization levels that may be utilized by quantizers in a multiuser system with finite-rate feedback to maximize the effective SNR.

Figure 5:
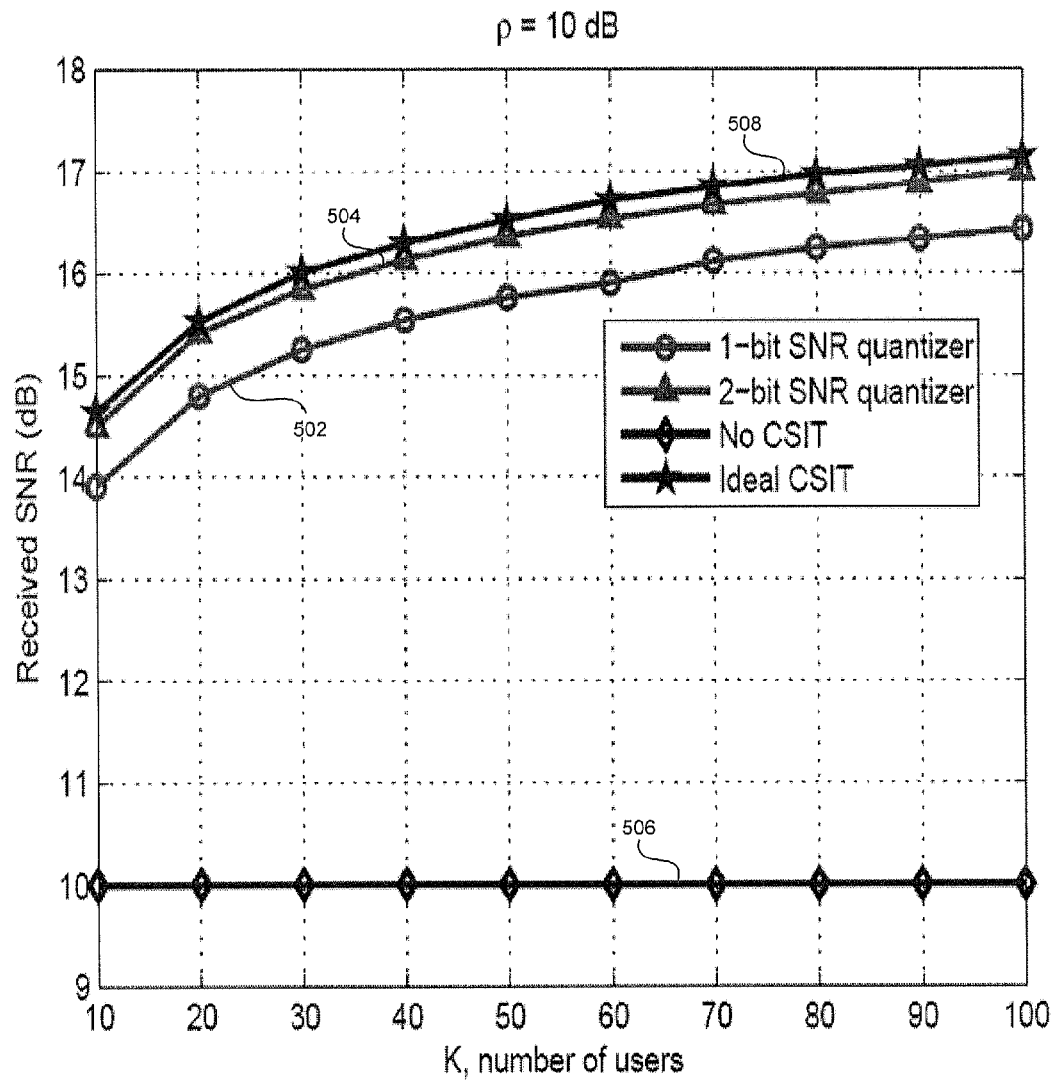
FIG. 5 is a graph that illustrates system effective SNR with respect to number of users K for no CIST, ideal CIST, and 1-bit and 2-bit quantizer with SNR as performance metric, in accordance with an embodiment of the present invention.

FIG. 5 is a graph that illustrates system effective SNR with respect to number of users K for no CIST, ideal CIST, and 1-bit and 2-bit quantizer with SNR as performance metric, in accordance with an embodiment of the present invention. Referring to FIG. 5, there are shown results of a numerical simulation for SNR ($\rho$=10) for various feedback link quality as a function of the number K of users in the system. The system may utilize different feedback rates, such as B=1 or 2 bits per channel update, for example. Four results are provided as illustrated by signals 502, 504, 506, and 508. The signal 502 may correspond to an instance when 1-bit per channel update may be utilized in the feedback link and the channel quantization levels are determined based on the approach described herein for SNR as the performance metric. The signal 504 may correspond to an instance when 2-bits per channel update may be utilized in the feedback link and the channel quantization levels are determined based on the approached described herein for SNR as the performance metric. The signal 506 may correspond to an instance when no information regarding the channel state information is available at the transmitter (CSIT). The signal 508 may correspond to an instance when ideal or perfect information of the CSIT is available. These results indicate that signals 502 and 504 corresponding to B=1 and B=2 bits per channel update respectively, provide an overall performance that is comparable to the ideal CSIT case.

Figure 6:
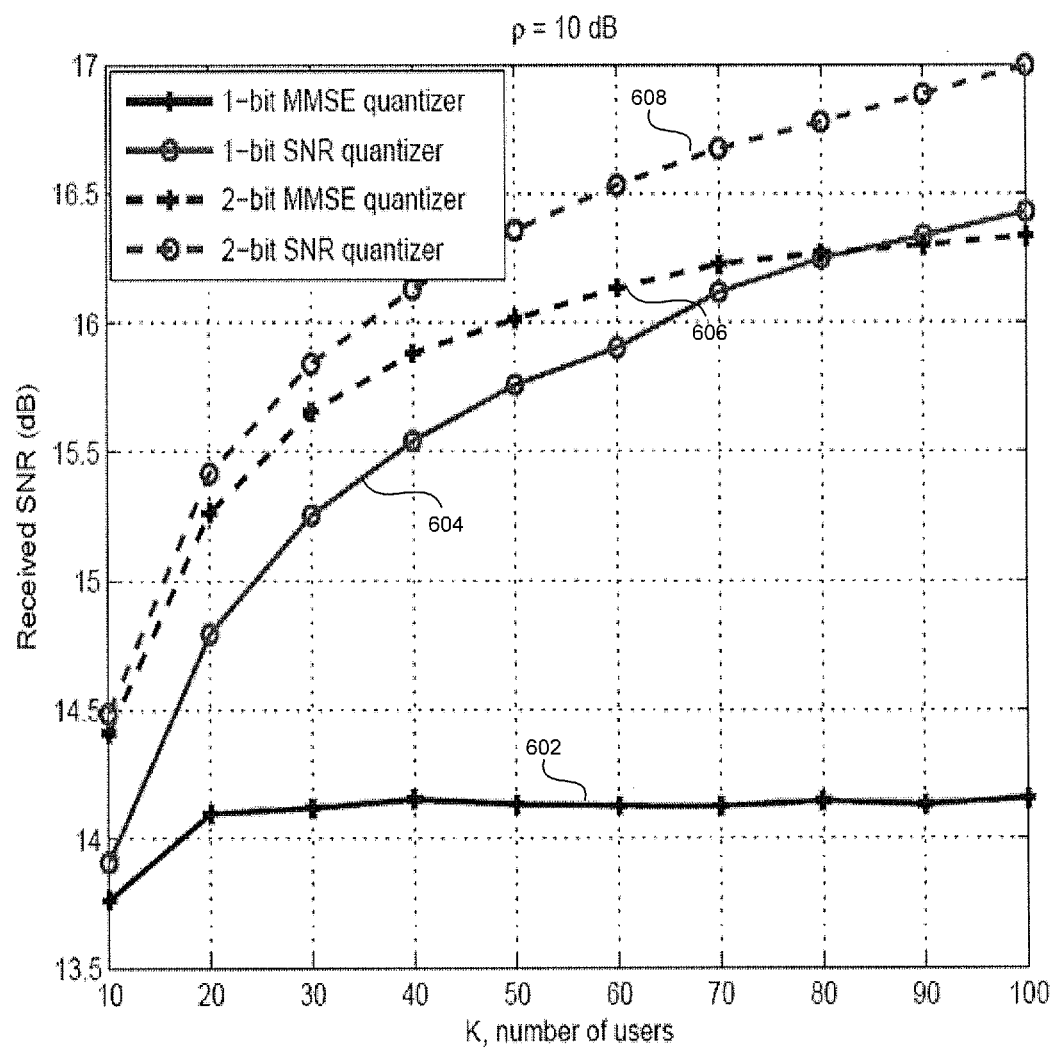
FIG. 6 is a graph that illustrates system effective SNR with respect to number of users K for 1-bit and 2-bit minimum mean-squared error (MMSE) quantizer, and 1-bit and 2-bit quantizer with SNR as performance metric, in accordance with an embodiment of the present invention.

FIG. 6 is a graph that illustrates system effective SNR with respect to number of users K for 1-bit and 2-bit minimum mean-squared error (MMSE) quantizer, and 1-bit and 2-bit quantizer with SNR as performance metric, in accordance with an embodiment of the present invention. Referring to FIG. 6, there are shown results of a numerical simulation for SNR ($\rho$=10) for various quantizers as a function of the number K of users in the system. The system may utilize different feedback rates, such as B=1 or 2 bits per channel update, for example. Four results are provided as illustrated by signals 602, 604, 606, and 608. The signal 602 may correspond to the performance of an MMSE quantizer when B=1 bit per channel update. In this regard, the MMSE quantizer is a scalar quantizer that minimizes the mean square quantization error. The signal 604 may correspond to the performance of a quantizer that utilizes channel quantization levels determined based on the approach described herein for SNR as the performance metric and B=1 bit per channel update. The signal 606 may correspond to the performance of an MMSE quantizer when B=2 bits per channel update. The signal 608 may correspond to the performance of a quantizer that utilizes channel quantization levels determined based on the approach described herein for SNR as the performance metric and B=2 bits per channel update. These results indicate that, at B=2 bits per channel update, the quantizer that utilizes quantization levels optimized for SNR as the optimization metric may have a higher received SNR than the MMSE quantizer.

Aspects of a method and system for using non-uniform channel quantization for a feedback-based communication system are provided. In accordance with various embodiments of the invention, a communication device such as the mobile device 122a may be operable to estimate channel state information (CSI) via a channel estimator such as the CE 132a for a channel from the base station 102a to the mobile device 122a. The estimated CSI may be non-uniformly quantized via a quantizer such as the channel quantizer 142a. The non-uniformly quantized CSI may be transmitted to the base station 102a over a finite-rate feedback channel such as the feedback link 109a. The estimated CSI may comprise channel quality information such as, for example, channel gain, channel quality indicator (CQI), signal-to-noise ratio (SNR), signal-to-noise-interference ratio (SNIR), channel capacity, and/or channel maximum mutual information rate associated with the channel, associated with the downlink channel. In this regard, the channel quantizer 142a may be operable to quantize different portions of the estimated CSI using different quantization step sizes. The channel quantizer 142a may be operable to determine the different quantization step sizes with respect to a performance metric function, for example, a channel capacity function of the estimated CSI. The channel quantizer 142a may be operable to increase a quantization step size for a portion of the estimated CSI, which corresponds to a low weight of the performance metric function (namely, low channel capacity and/or low probability density function of the estimated CSI). The channel quantizer 142a may be operable to decrease a quantization step size for a portion of the estimated CSI, which corresponds to a high weight of the performance metric function (namely, high channel capacity and/or high probability density function of the estimated CSI). The channel quantizer 142a may be operable to quantize the different portions of the estimated CSI using the determined different quantization step sizes. The quantized CSI may be transmitted to the base station 102a over the feedback link 109a. The mobile device 122a may be operable to receive data transmission from the base station 102a according to the transmitted CSI.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for using non-uniform channel quantization for a feedback-based communication system.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a communication system implementing multiuser diversity, the method comprising:
    performing by one or more processors and/or circuits in a communication device:
        estimating channel state information (CSI) for a channel from a base station to the communication device to produce an estimated CSI;
        non-uniformly and adaptively quantizing a plurality of portions of the estimated CSI in accordance with a plurality of quantization step sizes corresponding to a weight of a performance metric function characterizing a channel capacity function and a probability density function of the channel from the base station to the communication device to produce a non-uniform quantized CSI, wherein each of the plurality of quantization step sizes have an associated resolution; and
        transmitting the non-uniform quantized CSI to the base station over a finite-rate feedback channel.

2. The method according to claim 1, wherein the estimated CSI comprising channel gain, channel quality indicator (CQI), signal-to-noise ratio (SNR), signal-to-noise interference ratio (SNIR), channel capacity, and/or channel maximum mutual information rate associated with the channel.

3. The method according to claim 1, comprising quantizing different portions of the plurality of portions of the estimated CSI for the channel using different quantization step sizes of the plurality of quantization step sizes.

4. The method according to claim 3, comprising determining the different quantization step sizes according to corresponding channel quality information indicated by different portions of the plurality of portions of the estimated CSI with respect to the performance metric function.

5. The method according to claim 4, further comprising increasing a quantization step size for a portion of the plurality of portions of the estimated CSI if channel quality information indicated by the portion of the estimated CSI corresponds to a low weight of the performance metric function.

6. The method according to claim 4, further comprising decreasing a quantization step size for a portion of the plurality of portions of the estimated CSI if channel quality information indicated by the portion of the plurality of portions of the estimated CSI corresponds to a high weight of the performance metric function.

7. A communication device for use in multiuser communications, the communication device comprising:
one or more processors and/or circuits operable to:
estimate channel state information (CSI) for a channel from a base station to the communication device to produce an estimated CSI;
non-uniformly and adaptively quantize a plurality of portions of the estimated CSI in accordance with a plurality of quantization step sizes corresponding to a weight of a performance metric function characterizing a channel capacity function and a probability density function of the channel from the base station to the communication device to produce a non-uniform quantized CSI, wherein each of the plurality of quantization step sizes have an associated resolution; and
transmit the non-uniform quantized CSI to the base station over a finite-rate feedback channel.

8. The communication device of claim 7, wherein the estimated CSI comprising channel gain, channel quality indicator (CQI), signal-to-noise ratio (SNR), signal-to-noise-interference ratio (SNIR), channel capacity, and/or channel maximum mutual information rate associated with the channel.

9. The communication device of claim 7, wherein the one or more processors and/or circuits are operable to quantize different portions of the estimated CSI using different quantization step sizes.

10. The communication device of claim 9, wherein the one or more processors and/or circuits are operable to determine the different quantization step sizes according to corresponding channel quality information indicated by the different portions of the estimated CSI with respect to the performance metric function.

11. The communication device of claim 10, wherein the one or more processors and/or circuits are operable to increase a quantization step size for a portion of the estimated CSI if channel quality information indicated by the portion of the estimated CSI corresponds to a low weight of the performance metric function.

12. The communication device of claim 10, wherein the one or more processors and/or circuits are operable to decrease a quantization step size for a portion of the estimated CSI if channel quality information indicated by the portion of the estimated CSI corresponds to a high weight of the performance metric function.

13. The communication device of claim 10, wherein the one or more processors and/or circuits are operable to quantize the different portions of the estimated CSI using the determined different quantization step sizes.

14. A method for processing signals by a communication device in a multi-user wireless communication system implementing multiuser diversity, the method comprising:
receiving a plurality of channel state information (CSI) signals;
estimating the CSI for a channel of a base station based on at least one CSI signal of the plurality of CSI signals;
non-uniformly and adaptively quantizing the estimated CSI in accordance with a variable quantization step size that corresponds to a change of a performance metric function characterizing a channel capacity function and a probability density function of the channel to produce a non-uniform quantized CSI; and
transmitting the non-uniform quantized CSI to the base station over a finite-rate feedback channel.

15. The method according to claim 14, wherein the estimated CSI includes channel gain, channel quality indicator (CQI), signal-to-noise ratio (SNR), signal-to-noise interference ratio (SNIR), channel capacity, and/or channel maximum mutual information rate associated with the channel.

16. The method according to claim 15, wherein the non-uniformly and adaptively quantizing further comprising quantizing different portions of a plurality of portions of the estimated CSI using different quantization step sizes of the variable quantization step size.

17. The method according to claim 16, comprising determining the different quantization step sizes of the variable quantization step size according to corresponding channel quality information indicated by a change by the different portions of the estimated CSI with respect to the performance metric function.

18. The method according to claim 16, further comprising increasing the quantization step size of the variable quantization step size for a portion of the plurality of portions of the estimated CSI if channel quality information indicated by the portion of the estimated CSI corresponds to a low weight of the performance metric function.

19. The method according to claim 16, further comprising decreasing the quantization step size of the variable quantization step size for a portion of the plurality of portions of the estimated CSI if channel quality information indicated by the portion of the plurality of portions of the estimated CSI corresponds to a high weight of the performance metric function.

20. The method according to claim 14, wherein the non-uniformly and adaptively quantizing the estimated CSI is by a scalar quantizer based on the variable quantization step size.

* * * * *